United States Patent [19]

Dorman et al.

[11] 4,037,498

[45] July 26, 1977

[54] MOVABLE SIZING GAUGE

[75] Inventors: Evans D. Dorman, McCandless Township, Allegheny County, Pa.; William P. Getty, Odgen Dunes, Ind.

[73] Assignee: United States Steel Corporation, Pittsburgh, Pa.

[21] Appl. No.: 716,912

[22] Filed: Aug. 23, 1976

[51] Int. Cl.² ............................................... B23B 5/14
[52] U.S. Cl. ........................................... 82/86; 82/90; 82/101; 82/102; 82/48; 83/153; 83/165; 83/167; 83/104
[58] Field of Search .................. 83/153, 165, 167, 104; 82/48, 57, 70.1, 83, 86, 87, 89, 90, 91, 101, 102

[56] References Cited

U.S. PATENT DOCUMENTS 2,619,176  11/1952  Pearson ..................... 82/86

Primary Examiner—Donald R. Schran
Attorney, Agent, or Firm—John F. Carney

[57] ABSTRACT

The length of segments cut from steel blooms that can be conveniently removed from a pass line in which a sizing gauge is positioned in close aligned relation to the pass line is increased by mounting the sizing gauge on a movable carriage. Support rollers forming a bloom receptacle are positioned on the carriage adjacent the sizing gauge and means are provided to move the carriage to each of two positions whereby either the sizing gauge or the receptacle is aligned with the bloom pass line.

7 Claims, 3 Drawing Figures

MOVABLE SIZING GAUGE

BACKGROUND OF THE INVENTION

This invention relates to apparatus operative in a production line in which segments are cut from steel blooms at elevated temperature for subsequent processing into railroad car wheels or the like.

In a production line for the manufacture of railway wheels, or the like, hot rolled blooms of elongated cylindrical configuration called "logs" are formed by a rolling operation and then transferred along a pass line to a cutting station where segments of predetermined length, called "rounds", are cut from the logs. The cut rounds are permitted to fall from the pass line through a chute which conveys them to a station where they are collected and thereafter transferred to other stations where, by forging and other processing steps, they are formed into the finished product.

The cutting station typically includes a sizing gauge which is operably positioned in the pass line of the logs adjacent the cutting apparatus and contains a gauge head that is adjustably positionable with respect to the cutter. The gauge head operates as a limit stop which engages the leading end of the log as it traverses the pass line beneath the cutting apparatus and thereby accurately determines the position of the cut produced in the log by the cutting blade. The gauge head is retractable from its limit stop position to accommodate axial elongations of the log as cutting proceeds. After severence of a round, the gauge head is returned to its original position to receive the log end prior to the next cut being made.

It happens that the blooms or logs received from a rolling mill are not entirely perfect throughout their full length. Typically, the ends of the logs contain pipes which require cropping and occasionally blowholes or other imperfections are located intermediate the ends of the logs. Such imperfections prevent the affected portion of a log to be used as railroad wheel rounds. In these instances, the affected portion of the log must be severed and removed before the cutting of rounds can continue.

In the past, the sizing gauge has been fixedly positioned with respect to the cutting apparatus. Moreover, the space available for the passage of cuttings from the log into the discharge chute has been limited. While rounds and most crop ends can be conveniently passed, oftentimes, when imperfections occurred over an extended portion of a log, they have been severed but could not be passed through the discharge chute. In these instances, the operation of the production line was terminated and a crane with lifting tongs has to be brought to the site for removing the severed elongated segment from the line. This is both a time consuming and hazardous operation.

It is to an improvement of such installations, therefore, that the present invention is directed.

SUMMARY OF THE INVENTION

According to the present invention, there is provided an apparatus for cutting segments from elongated stock including a conveyor for moving said stock along a pass line, cutting means adjacent the end of said conveyor, means beneath the end of said conveyor for the gravity discharge of segments and an adjustable sizing gauge including a stop head operatively positioned in said pass line to be abutted by the end of said stock after said end has pased beyond said cutting means, the improvement comprising a movable carriage mounting said sizing gauge, means for moving said carriage transversely of said pass line, and means on said carriage forming a receptacle to receive stock from said conveyor when said conveyor is moved to position said sizing gauge out of alignment with said pass line.

It is a particular object of the invention to provide improved apparatus for cutting segments from elongated stock from which the removal of oversized stock is facilitated.

It is another object of the invention to provide improved apparatus for cutting segments from elongated stock which obviates the need for crane-lifting oversized stock from the conveyor.

Yet another object of the invention is to provide improved apparatus for cutting segments from elongated stock in which the down time of the production line is reduced when the need for removing oversized stock from the conveyor arises.

For a better understanding of the invention, its operating advantages and the specific objectives obtained by its use, reference should be made to the accompanying drawings and description which relate to a preferred embodiment thereof.

DESCRIPTION OF A PREFERRED EMBODIMENT OF THE INVENTION

Figure 1:
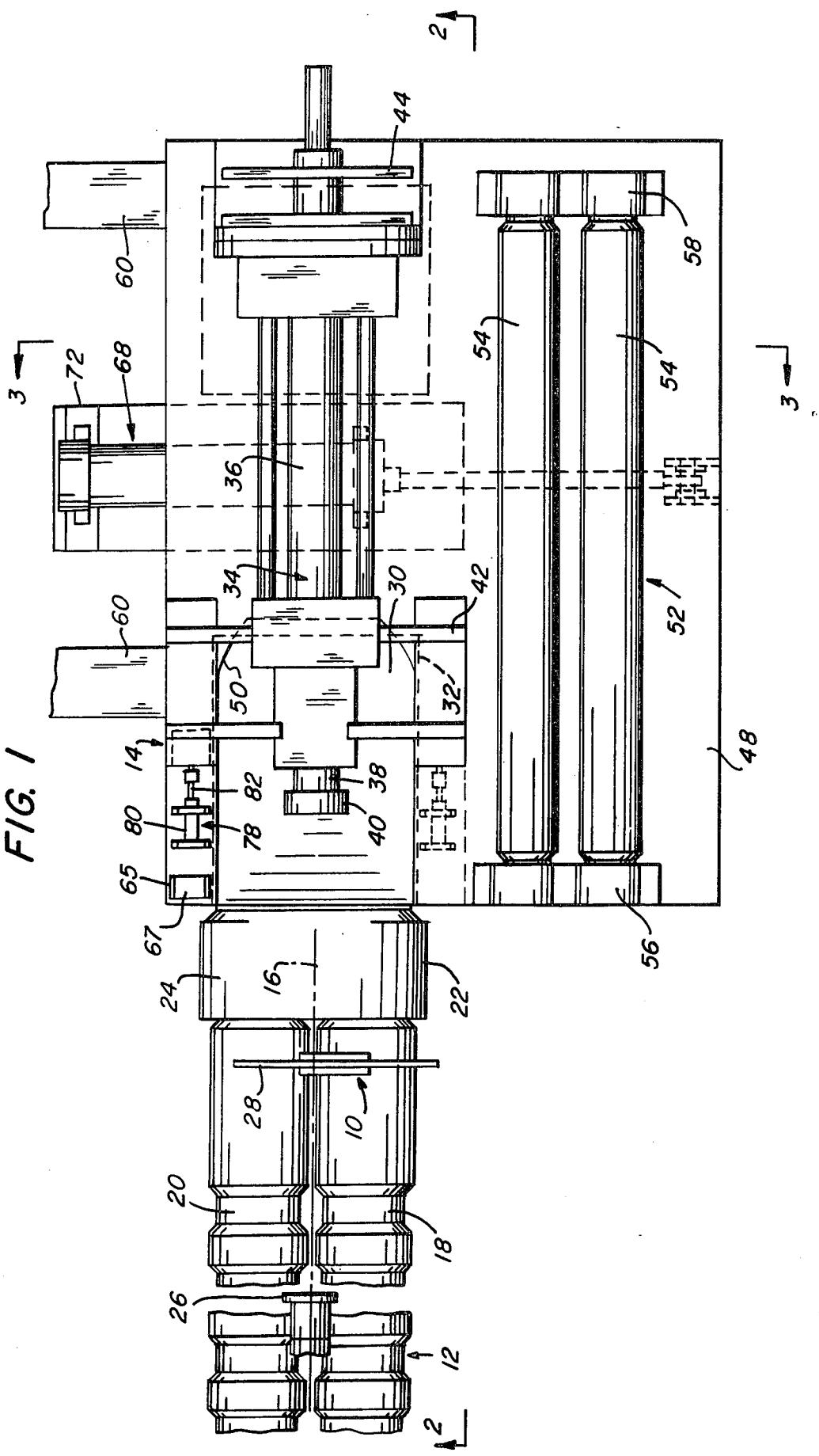
FIG. 1 is a plan view of stock cutting apparatus according to the present invention.
Figure 2:
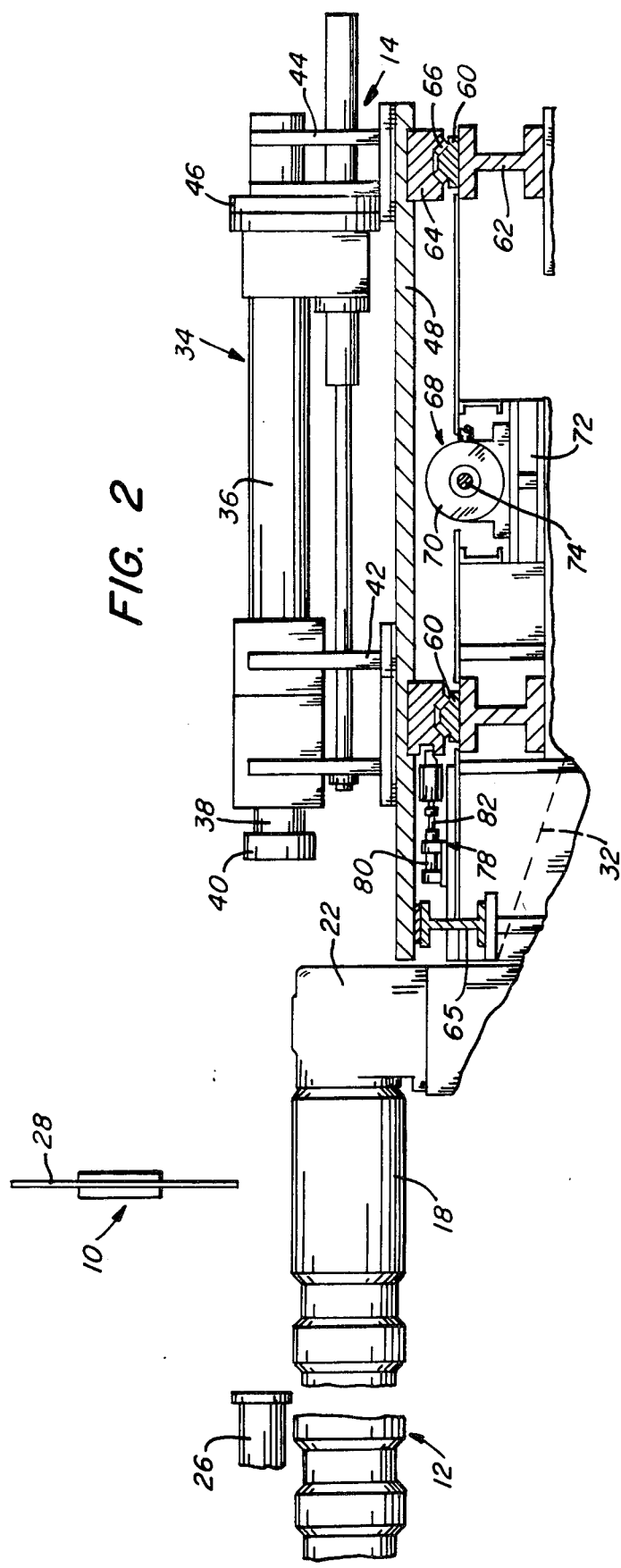
FIG. 2 is a sectional view taken along 2—2 of FIG. 1.
Figure 3:
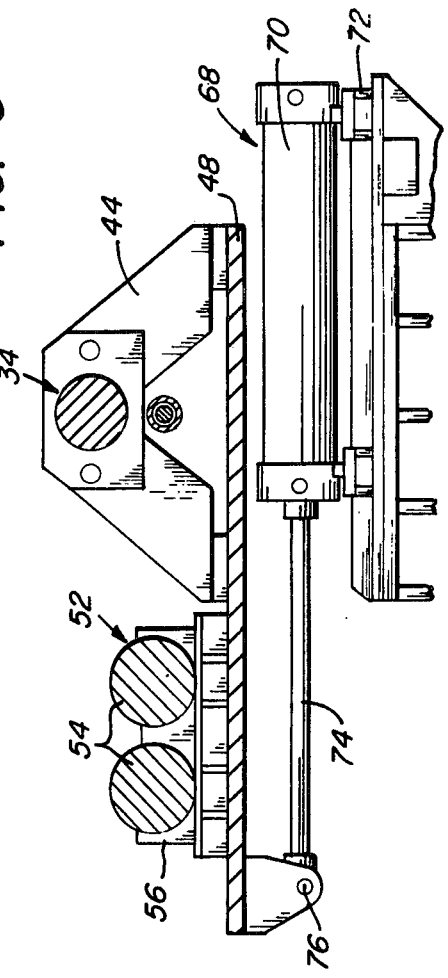
FIG. 3 is a sectional view taken along line 3-3 of FIG. 1.

There is shown in FIG. 1 the pertinent portion of a production line for the manufacture of railroad wheel in which stock in the form of hot rolled steel blooms of elongated cylindrical configuration, called "logs" herein, are cut into segments of desired length, called "rounds". Included are a stock cutting machine 10, a conveyor 12 and a carriage assembly 14, all as hereinafter described. The conveyor 12 in operative to conduct cylindrical hot rolled logs received from a rolling mill (not shown) along a pass line indicated by centerline 16 to the cutting machine 10. The conveyor 12 includes a pair of parallel rollers 18 and 20 journalled for rotation at their opposite ends in bearings 22 and 24 and suitable drive means (not shown) for rotating the rollers substantially uniformly in the same direction. A pusher-type feed mechanism 26 serves to convey the log along the rollers to the cutting machine 10 and for advancing the same between cuts.

For the sake of brevity, the details of the cutting machine 10 are not described herein as they are not germain to a description of the present invention. In fact, the cutting machine employed can be any of a number of diverse types. One such type of cutting machine which is capable of use in the organization described herein is as shown and described in U.S. Pat. No. 2,619,176 to A. B. Pearson and assigned to the assignee of this application.

In the drawings hereof, the cutting machine 10 is represented by the single circular cutting blade 28 positioned adjacent the discharge, or right hand, end of the conveyor 12. The cutting blade, which may be motor driven or not, is adapted to be advanced downwardly across the pass line 16 thus passing transversely through the log which extends beneath the blade to sever the segments or rounds as more fully described hereinafter. The rounds cut from the log are caused to pass by gravity downwardly through an opening 30 disposed below the discharge end of the conveyor 12. This opening 30 defines the inlet to a chute 32 for conducting the rounds to a collector (not shown) for subsequent transfer to another station for further processing.

The axial length of the rounds cut from each log is determined by a sizing gauge 34 in the form of an end stop of well known design that is operably positioned to engage the leading end of the log as it moves along the pass line thereby to locate the desired position of the cut on the log prior to each actuation of the cutting machine. The sizing gauge 34 comprises a fluid operated cylinder 36 having an axially extensible and retractable ram 38 therein, the latter being provided on its end with a stop head 40 for engagement with the log. The cylinder 36 is supported on axially spaced sets of saddle plates 42 and 44 and is adapted for axial adjustment thereon by means of one or more shims 46 that may be selectively disposed between the rear end of the cylinder and the right hand set of saddle plates 44.

In practice, the ram 38 is extended to its set position with respect to the blade 28 and the pusher 26 actuated to transfer the log along the pass line 16 until its leading end abuts the stop head 40. Following this, the cutting machine 10 is actuated and simultaneously therewith the ram 38 is retracted thereby to accommodate axial elongation of the log as the cutting blade penetrates the same. Following the severance of a round, which falls by gravity through the opening 30 into the discharge chute 32, the ram is again extended to meet the fresh log end and the cycle repeated.

According to the present invention, the sizing gauge 34 is mounted on a carriage 14 that is movable laterally with respect to the pass line 16 to facilitate removal of oversize stock as hereinafter explained. The carriage 14 comprises a generally rectangular plate 48 having a cutaway opening 50 extending inwardly from one side edge thereof to accommodate passage of a severed round to the chute 32. Also positioned on the plate 48 is a receptacle 52 located adjacent the sizing gauge 34 and formed of a pair of parallel rollers 54 that are journalled for rotation at their ends in oppositely spaced bearings 56, 58. As shown in FIG. 1, the rollers 54 are formed of a length to dispose the bearing 56 in closely spaced relation to the bearing 24 of the conveyor 12 in order to facilitate reception of a piece of stock pushed from the conveyor.

The carriage plate 48 is carried on rails 60 supported by footings 62 that are coextensive with the rails and extend laterally of the pass line 16. Movement of the carriage along the rails 60 is guided by means of ways 64 attached to the underside of the plate in engaging relation to the rails. As shown, lubricated wear pads 66 may be interposed between the rails 60 and ways 64 to facilitate movement of the carriage. An outboard support 65 is provided to accommodate the extended length of plate required at one side of the carriage 14 for locating bearing 56 closely adjacent the end of the conveyor 12. This support 65 is split, as shown in FIG. 1, to permit the free passage of material into the chute 32 and may be provided with a lubricated wear pad 67 similar to the pads 66 between the rails 60 and ways 64.

The carriage 14 is selectively moved to one of two operating positions with respect to the pass line 16 by means of a double acting fluid motor 68. The motor 68 includes a cylinder 70 that is fixed beneath the plate 48 to footings 72 and which contains a ram 74 connecting at its end to the underside of the plate by means of a pin-and-yolk connection 76. The stroke of the ram 74 is such that with the ram in its fully extended position the carriage is disposed to locate stop head 40 of the sizing gauge 34 in alignment with the pass line 16. With the ram 74 in its fully retracted position, the receptacle 52 is disposed in alignment with the pass line 16.

A locking mechanism 78 in the form of a fluid cylinder 80 and extensible ram 82 adapted, when extended, to frictionally engage the adjacent way 64 is provided to lock the carriage 14 in each of its two operative positions. Actuation of the cylinder 80 to operate ram 82 is sequenced with respect to actuation of the fluid motor 68 to extend the locking ram 82 when the ram 74 reaches either its fully extended or fully retracted position.

It will be appreciated that, by means of the present invention, oversized stock can be conveniently removed from the conveyor 14 without the need of crane-operated lifting tongs whereby to reduce the amount of downtime of the line and concomitantly to increase productivity of the cutting operation. As the production of rounds proceeds and imperfect material through an inordinate length of the log is encountered, fluid motor 68 is simply actuated by the operator to move the carriage 14 along rails 60 laterally of the pass line 16 thereby to remove the sizing gauge 34 from its aligned position in the pass line and to replace it with the receptacle 52. Thereafter, the pusher mechanism 26 is actuated to move the affected portion of the log to the opposite of the cutting blade 28 and a cut made. The carriage 14 is then returned to its original position whereby the cutting of rounds can be resumed. As the production of rounds proceeds a crane can be brought in to remove the oversize stock from the receptacle 52, all without lengthy description of the production line.

It will be understood that various changes in the details, materials and arrangements of parts which have been herein described and illustrated in order to explain the nature of the invention, may be made by those skilled in the art within the principle and scope of the invention as expressed in the appended claims.

We claim:

1. In apparatus for cutting segments from elongated stock including a conveyor for moving said stock along a pass line, cutting means adjacent the end of said conveyor, means beneath the end of said conveyor for the gravity discharge of segments and an adjustable sizing gauge including a stop head operatively positioned in said pass line to be abutted by the end of said stock after said end has passed beyond said cutting means, the improvement comprising:
   a. a movable carriage mounting said sizing gauge;
   b. means for moving said carriage transversely of said pass line; and
   c. means on said carriage forming a receptacle to receive stock from said conveyor when said conveyor is moved to position said sizing gauge out of alignment with said pass line.

2. Apparatus as recited in claim 1 including rails extending laterally of said pass line mounting said carriage.

3. Apparatus as recited in claim 1 in which said receptacle comprises a pair of closely spaced parallel rolls positioned in adjacent relation to said sizing gauge.

4. Apparatus as recited in claim 2 in which said carriage moving means comprises motor means operatively connected to said carriage for moving the same along said rolls.

5. Apparatus as recited in claim 4 in which said motor means comprises a double acting fluid motor operative to move said carriage alternately to a position disposing said sizing gauge in alignment with said pass line or one disposing said receptacle in alignment therewith.

6. Apparatus as recited in claim 5 including means for locking said carriage in each of said alternate positions.

7. Apparatus as recited in claim 6 in which said carriage includes guide ways for mounting said carriage on said rails and said locking means includes means for laterally displacing said guide ways with respect to said rails for effecting a friction lock therebetween.

* * * * *